United States Patent
Boisset et al.

(10) Patent No.: US 6,357,814 B1
(45) Date of Patent: Mar. 19, 2002

(54) VEHICLE SEAT ASSEMBLY COMPRISING A REMOVABLE SEAT ASSEMBLED ON GUIDE RAILS

(75) Inventors: Bernard Boisset, Etampes; Jean-Michel Lejeune, Ascheres le Marche; Laurent Schwartz, Etampes, all of (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/215,995

(22) Filed: Dec. 18, 1998

(30) Foreign Application Priority Data

Dec. 22, 1997 (FR) .............................. 97 16244
Jul. 8, 1998 (FR) .............................. 98 08753

(51) Int. Cl.⁷ .......................... B60N 2/07; B60N 2/075; B60N 2/08
(52) U.S. Cl. ................... 296/65.03; 296/65.13; 296/65.05; 297/344.1; 248/503.1; 248/429
(58) Field of Search ............... 296/65.03, 65.13, 296/65.05; 248/503.1, 429, 430; 297/344.1

(56) References Cited

U.S. PATENT DOCUMENTS

| 3,453,025 A | * | 7/1969 | Grant | 297/344.1 |
| 4,189,957 A | * | 2/1980 | Gedig et al. | 297/344.1 |
| 4,277,043 A | | 7/1981 | Weik | 248/503.1 |
| 4,726,617 A | * | 2/1988 | Nishmura | 296/65.13 |
| 5,280,987 A | * | 1/1994 | Miller | 296/65.13 |
| 5,364,152 A | * | 11/1994 | Mastrangelo et al. | 296/65.03 |
| 5,472,165 A | * | 12/1995 | Gruber | 297/344.1 |
| 5,676,341 A | * | 10/1997 | Tarusawa et al. | 296/65.13 |
| 5,797,575 A | * | 8/1998 | Clausen | 296/65.13 |

FOREIGN PATENT DOCUMENTS

| DE | 91 13 919.8 | | 4/1992 | |
| DE | 93 14 844.5 | | 3/1994 | |
| EP | 0114740 | * | 8/1984 | 248/503.1 |
| EP | 000158990 A | * | 10/1985 | 297/344.11 |
| EP | 000582773 A1 | * | 2/1994 | 248/503.1 |
| EP | 0 803 396 | | 10/1997 | |
| FR | 2 700 735 | | 7/1994 | |
| GB | 002240469 A | * | 8/1991 | 248/503.1 |
| JP | 402133250 A | * | 5/1990 | 296/65.13 |
| JP | 402293225 A | * | 12/1990 | 248/503.1 |
| JP | 402310132 A | * | 12/1990 | 248/503.1 |
| JP | 403204348 A | * | 9/1991 | 248/503.1 |
| JP | 405286383 A | * | 11/1993 | 248/503.1 |
| JP | 405330369 A | * | 12/1993 | 248/503.1 |

OTHER PUBLICATIONS

French Preliminary Search Report dated Aug. 28, 1998, French Appl. No. FR9716244.
WPIL Derwent Data Base abstract corresponding to EPO 0 803 393 Oct. 1997.
WPIL Derwent Data Base abstract corresponding to FR 2 700 635 July 1994.

* cited by examiner

Primary Examiner—Stephen T. Gordon
Assistant Examiner—Hilary Gutman
(74) Attorney, Agent, or Firm—Marshall, Gerstein & Borun

(57) ABSTRACT

A vehicle seat the feet of which are assembled in a removable manner on two fixed sections by means of vertical jaws which ensure the coupling of the seat onto the fixed sections.

31 Claims, 12 Drawing Sheets

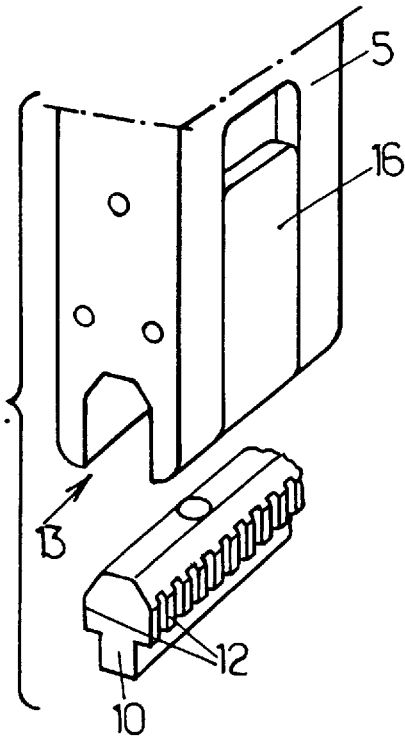
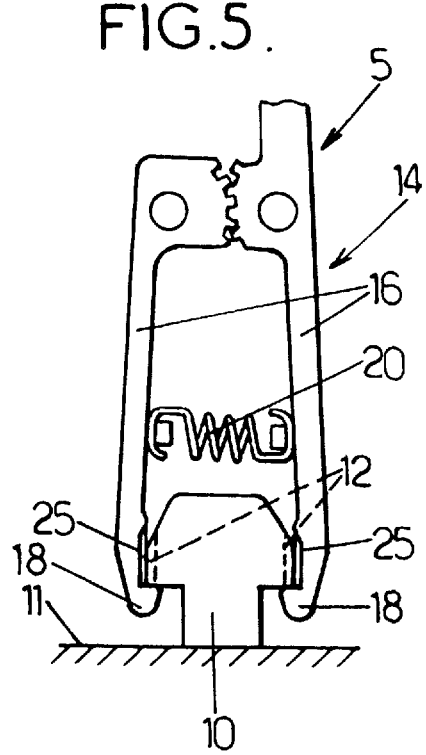
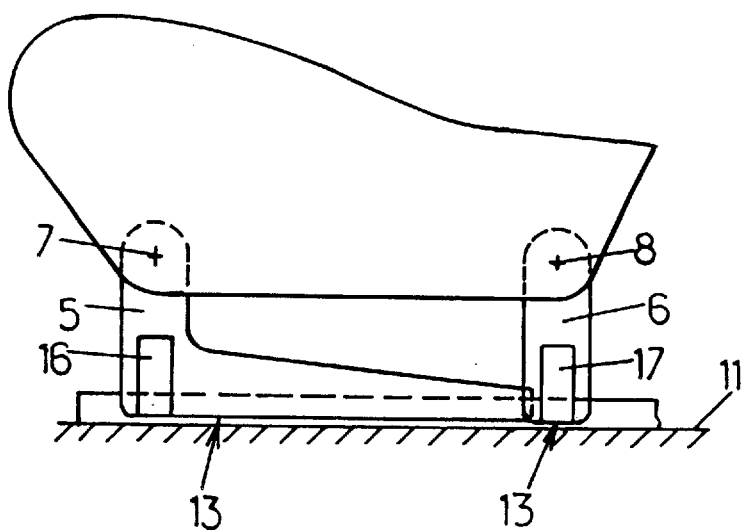

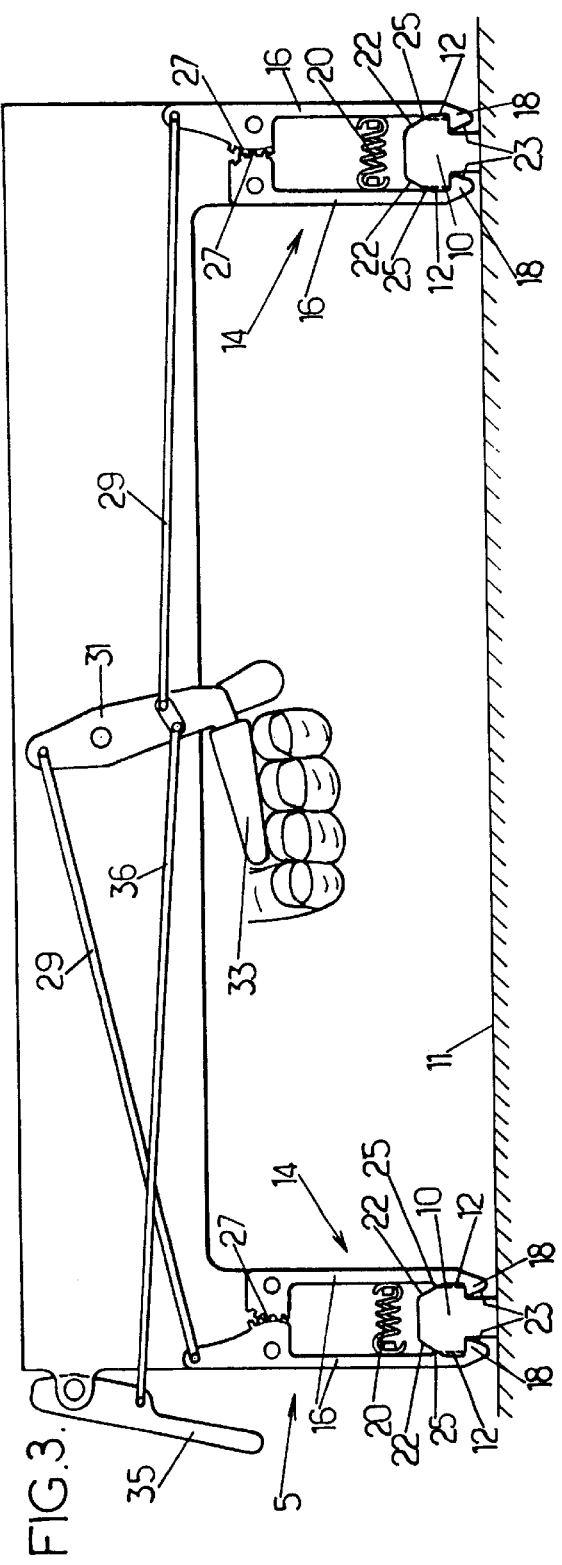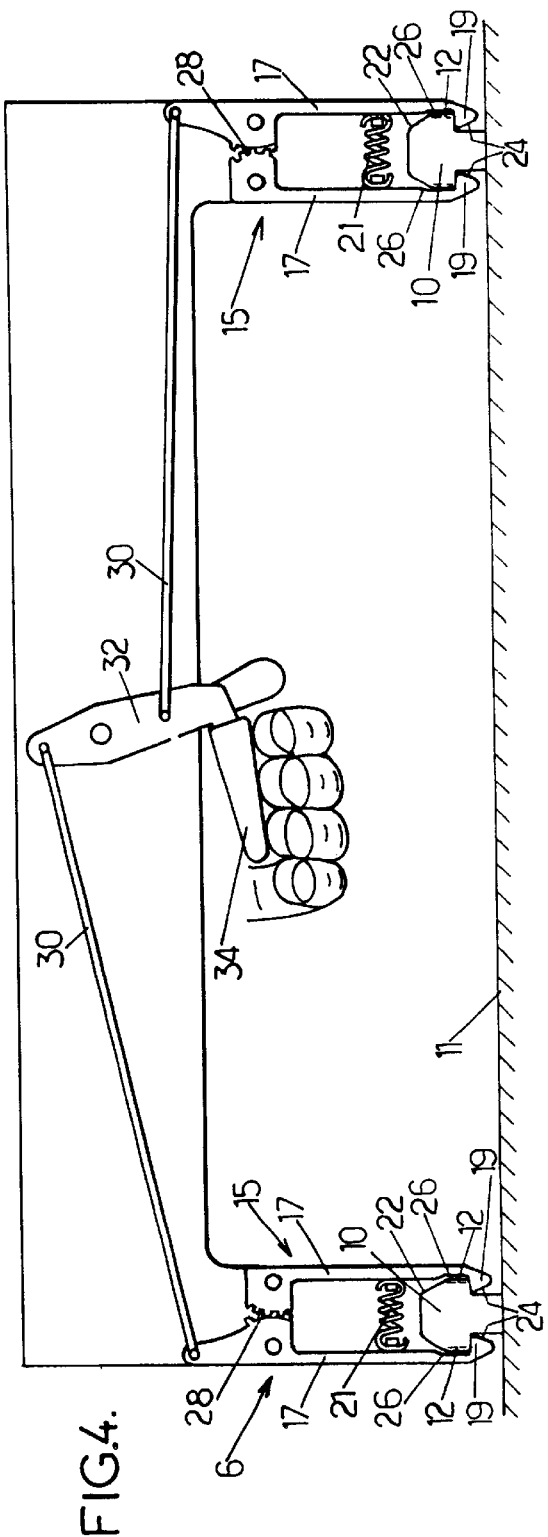

FIG.7.
FIG.8.
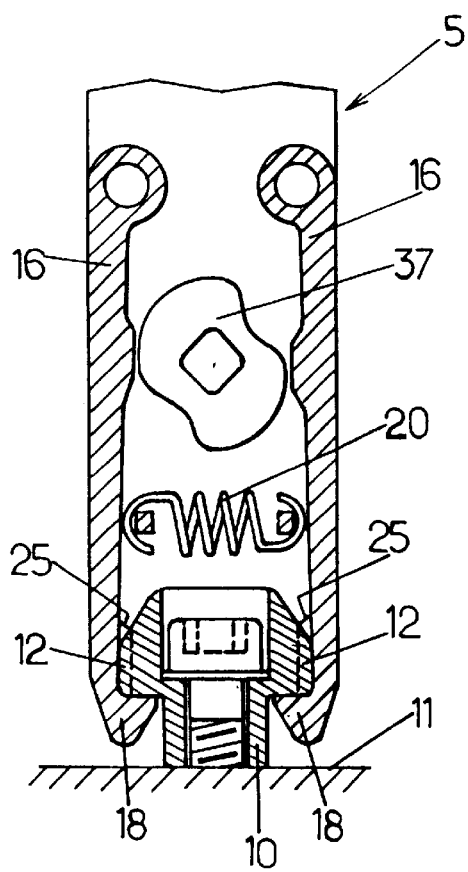
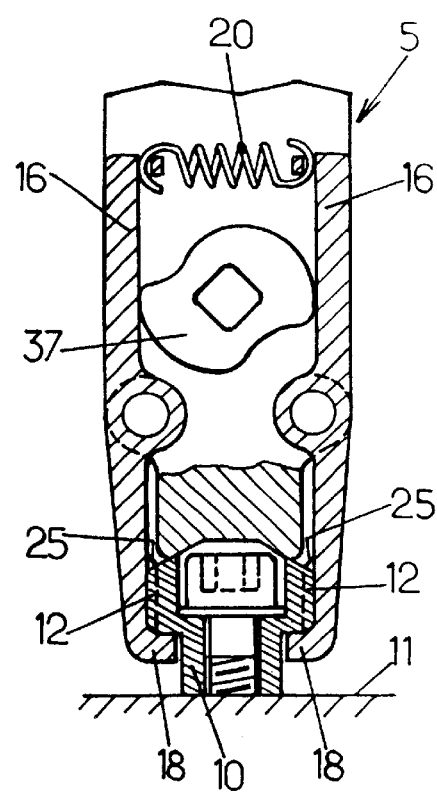

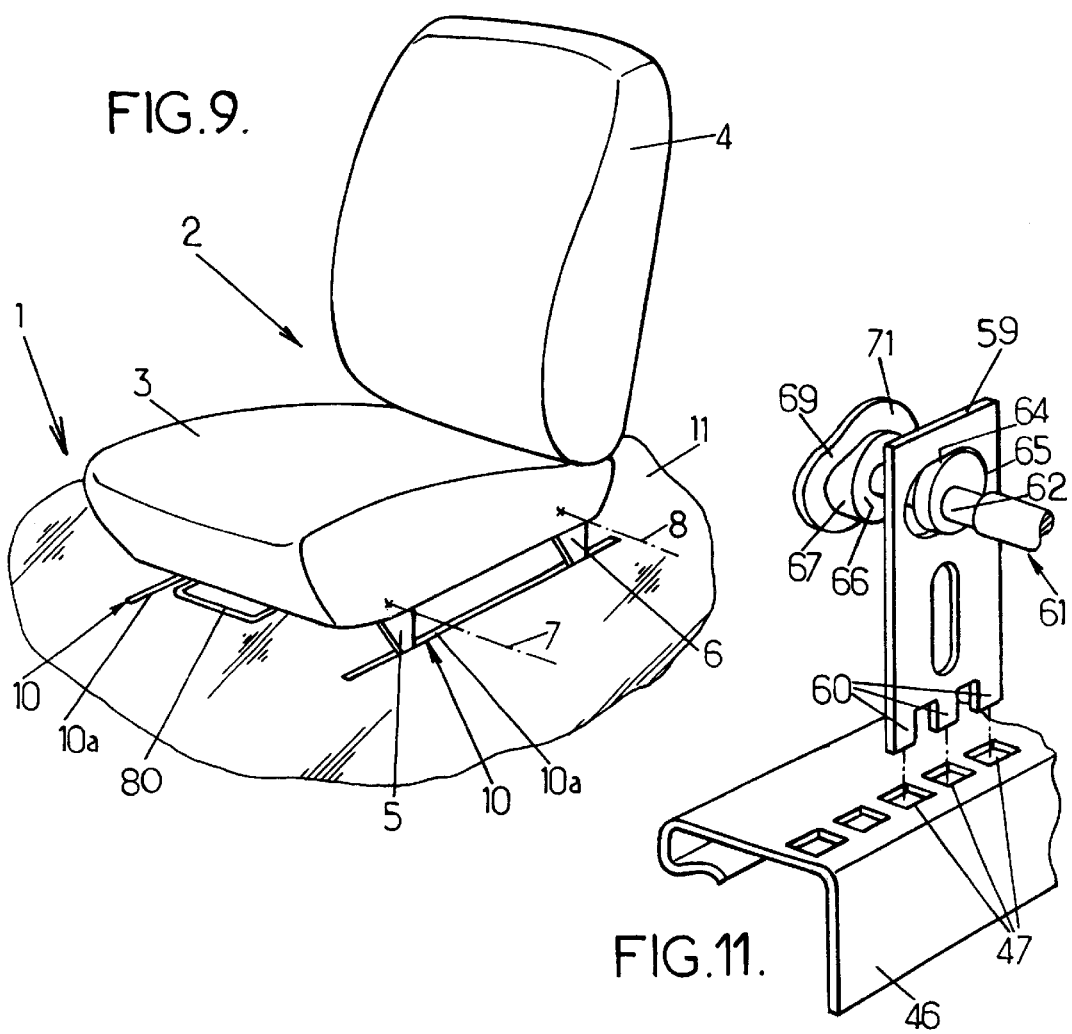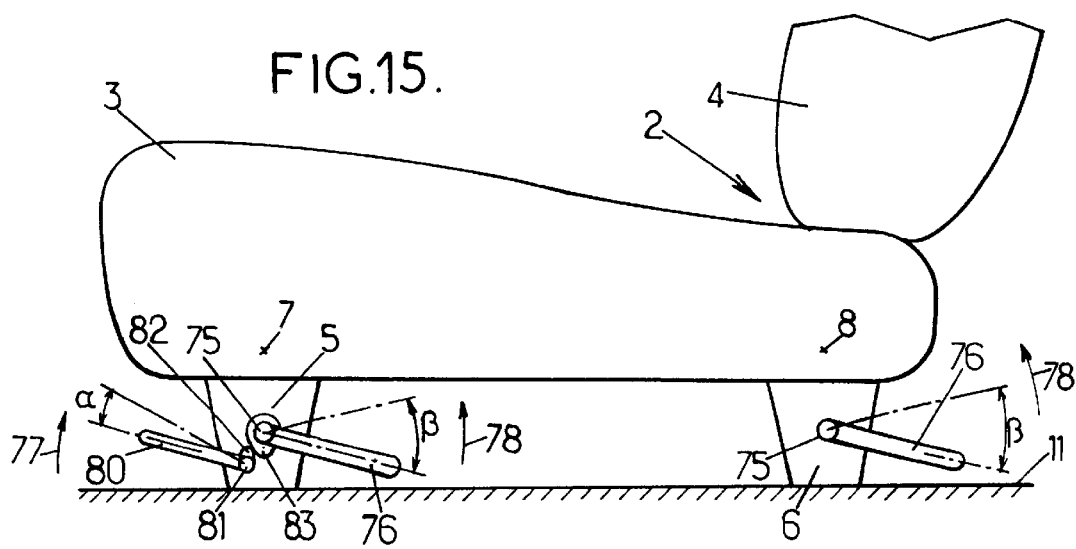

VEHICLE SEAT ASSEMBLY COMPRISING A REMOVABLE SEAT ASSEMBLED ON GUIDE RAILS

FIELD OF THE INVENTION

The present invention relates to seat assemblies for vehicles, comprising a removable seat assembled on guide rails.

More particularly, the invention concerns a vehicle seat assembly, comprising:

at least one first guide rail including a fixed section which is intended to be integral with the vehicle floor and which extends in a longitudinal direction, said fixed section comprising a longitudinal edge, and a seat having at least one first foot which is assembled in a removable manner on the guide rail to enable the seat to be vertically detached from the guide rail, said first foot comprising a coupling lock which is movable between a locked position where said coupling lock engages with the guide rail to make said first foot integral with said guide rail and a withdrawn position where said first foot can separate vertically from the guide rail, said seat having control means for moving said coupling lock between said locked and withdrawn positions.

BACKGROUND OF THE INVENTION

Document FR-A-2 700 735 describes an example of such a seat assembly, in which the guide rail comprises a movable section which is sliding assembled along the fixed section, this movable section being able to be immobilized by a guide rail lock which is carried by aforesaid guide rail and which is controlled by a guide rail control device assembled on the seat.

The arrangements proposed in the aforementioned document require that the guide rail control device be perfectly connected with the guide rail lock when the seat is reassembled on its guide rail after having been removed. This requirement causes significant constraints on the seat design, particularly if it is desired to assemble the seat facing towards either the front or rear of the vehicle.

Moreover, the seat assembly described in the aforementioned document as also the disadvantage that the restraining forces of the seat are passed through the movable section: this imposes a sufficient sizing of this movable section and its connections with the seat and with the fixed section, which tends to again increase the cost of the seat assembly.

OBJECTS AND SUMMARY OF THE INVENTION

The present invention has the particular object of easing these disadvantages.

To this end, a first object of the invention is a seat assembly comprising: at least one first guide rail including a fixed section which is intended to be integral with the vehicle floor and which extends in a longitudinal direction, said fixed section comprising a longitudinal edge, and a seat having at least one first foot which is assembled in a removable manner on the guide rail to enable the seat to be vertically detached from the guide rail, said first foot comprising a coupling lock which is movable between a locked position where said coupling lock engages with the guide rail and a withdrawn position where said first foot can separate vertically from the guide rail, said seat having a control device for moving said coupling lock between said locked and withdrawn positions, wherein the coupling lock includes a first jaw part which extends downward from said first foot to a coupling claw, the first jaw part being pivotally mounted about a jaw rotation axis parallel to the longitudinal direction, said coupling lock engaging under said longitudinal edge of the fixed section when the coupling lock is in its locked position, thus preventing vertical separation of said first foot and the fixed section, and said coupling claw being sufficiently separated from the fixed section when the coupling lock is in its withdrawn position so that said coupling claw does not interfere with said fixed section during vertical separation of said first foot and said fixed section, and wherein said longitudinal edge of the fixed section delimits an open space which is situated underneath said longitudinal edge, said open space being arranged to enable said coupling claw to move in said open space during longitudinal movement of the seat.

By means of these arrangements the problems of the prior art relative to the separation of the guide rail lock and its control device when the seat is removed are avoided.

Moreover, the anchoring of the seat foot is made directly on the fixed section, which reinforces the solidity of the anchoring of the seat on the vehicle floor.

Furthermore, the guide rail movable section is totally eliminated, which decreases the cost of the seat assembly. Thus, the guide rail of the seat assembly according to the invention has a size reduced to the absolute minimum and does not give any discomfort to the vehicle passengers when the seat is removed. In the preferred embodiments of the invention, recourse may possibly by had moreover to one and/or other of the following arrangements as described below. In one embodiment, the first jaw part may be adapted to cooperate with the fixed section to prevent longitudinal movement of the seat when the coupling lock is in its locked position. The control device may be adapted to raise the first jaw part to apply the coupling claw of the first jaw part under the longitudinal edge of the fixed section, with clamping, when the first jaw part is in its locked position, thereby preventing longitudinal movement of the seat. The fixed section may include notches which are arranged under the longitudinal edge of said fixed section and the coupling claw may have upwardly directed teeth which are adapted to engage in the notches when the coupling lock is in its locked position, thereby preventing longitudinal movement of the seat. The control device may be adapted to move the coupling lock between the locked position, the withdrawn position, and an intermediate position where the first jaw part is in a sliding position and where the coupling claw of said first jaw part protrudes under the longitudinal edge of the fixed section, thereby preventing vertical separation of said first foot from the fixed section, but where the first jaw part is sufficiently separated from the fixed section to enable longitudinal movement of the seat. The control device may include a transverse control shaft which is pivotally mounted relative to the seat and which is movable between first and second positions corresponding respectively to the locked and withdrawn positions of the coupling lock.

In some embodiments, the seat assembly may further comprise a first control cam which is fixed to the transverse control shaft and which is arranged radially relative to the transverse control shaft. The first control cam may be adapted to pivot the first jaw part to a withdrawn position corresponding to the withdrawn position of the coupling lock when the control shaft is in its first position. The first control cam may be arranged to not interfere with the first jaw part when the transverse control shaft is in its second position, and the coupling lock may be resiliently assisted to its locked position. The first jaw part may be further slidingly mounted within the first foot in a substantially vertical direction.

In some embodiments, the seat assembly may further comprise a second control cam which is fixed to the transverse control shaft and which is arranged radially relative to the transverse control shaft. The second control cam may engage with the first jaw part to raise the first jaw part and, thus, apply the coupling claw of the first jaw part under the longitudinal edge of the fixed section with clamping when the transverse control shaft is in its first position, and may lower the first jaw part to enable longitudinal movement of the seat when the control shaft is in an intermediate position between its first and second positions. The longitudinal edge of the fixed section may have a longitudinal groove facing downward and the coupling claw may have a nose which projects upwardly and which is adapted to engage in the longitudinal groove when the control shaft is in its first position. The fixed section may comprise a body at least partially made of aluminum and a folded steel sheet which partially covers the body and which comprises notches. The coupling claw of the first jaw part may be adapted to engage with the notches when the coupling lock is in its locked position. The coupling lock may include only the first jaw part.

In some embodiments, the seat assembly may further comprise a second guide rail including a fixed section which is similar to the fixed section of the first guide rail. The seat assembly may further comprise at least a second foot which is assembled in a vertically removable manner on the foot section of the second guide rail by an additional first jaw part which has a coupling claw. The coupling claws of the first jaw parts of the first and second feet may extend in mutually opposite directions so that the coupling claws of the first and second feet both face inwardly or outwardly. More specifically, the mutually opposite facing directions of the jaw parts includes embodiments in which the jaw parts are oriented to face toward each other (as shown) and embodiments in which the jaw parts face away from each other (not shown). The fixed section may have a substantially upward opening U section, with a substantially horizontal base and two substantially vertical webs. One of the webs may comprise the longitudinal edge which projects towards the other web. The first jaw part may be adapted to penetrate between the webs of the fixed section so that the coupling claw can engage under the longitudinal edge on the fixed section. The first foot may have a guide pin projecting downwards that is adapted to engage between the webs of the fixed section with little clearance. The first foot may be pivotally mounted on the seat along a transverse horizontal rotational axis in a manner allowing small movements of the first foot perpendicular to the transverse horizontal rotational axis. The coupling lock may further include a second jaw part and the first and second jaw parts may be arranged on either side of the fixed section. The coupling claw of the first jaw part may project substantially horizontally towards the second jaw part and the coupling lock may be adapted so that the fixed section is clamped horizontally between the first and second jaw parts when said coupling lock is in its locked position, thereby preventing longitudinal movement of the seat. The coupling lock may be adapted so that the second jaw part does not interfere with the fixed section when the coupling lock is in its withdrawn position, thereby enabling vertical separation of the first foot from the fixed section. At least the first jaw part may comprise teeth arranged toward the fixed section and the fixed section may have complementary teeth which engage with the teeth of the first jaw part to prevent longitudinal sliding of the seat when the coupling lock is in its locked position. The second jaw part may also be movable during movement of the coupling lock between its locked and withdrawn positions. The second jaw part may comprise an additional coupling claw which projects substantially horizontally towards the first jaw part and which is engaged under an additional longitudinal edge belonging to the fixed section when the coupling lock is in its locked position. The second jaw part may be sufficiently separated from the fixed section when the coupling lock is in its withdrawn position so that the coupling claw of the second jaw part does not interfere with the fixed section during vertical separation of the first foot and the fixed section. The second jaw part may comprise teeth arranged toward the fixed section and the fixed section may have complementary teeth which engage with the teeth of the second jaw part to prevent longitudinal sliding of the seat when the coupling lock is in its locked position. The coupling lock may have a sliding position, intermediate between its locked and withdrawn positions, where the first and second jaw parts are sufficiently separated from the fixed section to enable longitudinal sliding of the seat, but where at least the coupling claw of the first jaw part protrudes under the longitudinal edge of the fixed section.

In some embodiments, the seat assembly may further comprise a second guide rail including a fixed section which is intended to be integral with the vehicle floor and which extends in the longitudinal direction. The fixed section of the second guide rail may comprise two opposite longitudinal edges which protrude laterally from the fixed section of the second guide rail. The seat assembly may further include a second foot which comprises a coupling lock and the coupling lock of the second foot may include first and second jaw parts which are arranged on either side of the fixed section of the second guide rail and which extend downward from the second foot to form respective coupling claws that project substantially horizontally toward the fixed section of the second guide rail. The coupling lock may be movable by the control device between a withdrawn position where the first and second jaw parts of the second foot are sufficiently separated from the fixed section of the second guide rail to enable vertical separation of the second foot from the fixed section of the second guide rail, a locked position where the coupling claws of the first and second jaw parts are engaged respectively under the two longitudinal edges of the fixed section of the second guide rail and where the fixed section of the second guide rail is clamped horizontally between the two jaw parts of the second foot, thus preventing longitudinal movement of the seat as well as vertical separation of the second foot from the fixed section of the second guide rail, and an intermediate position where the two jaw parts of the second foot are not clamped against the fixed section of the second guide rail and when the coupling claws of said first and second jaw parts are protruding under the longitudinal edges of the fixed section of the second guide rail, thus enabling longitudinal movement of the seat but preventing vertical separation of the second foot from the fixed section of the second guide rail. The fixed section of the second guide rail may be arranged to enable sliding of the coupling claws of the first and second jaw parts under the two longitudinal edges of said fixed section of the second guide rail.

In still further embodiments, the seat assembly may further comprise third and fourth feet that connect on the respective fixed sections of the first and second guide rails and which may be assembled in a removable manner respectively on said fixed sections. Each of the third and fourth feet may comprise a coupling lock including first and second jaw parts which are arranged on either side of the corresponding fixed section and which each extend downward from the corresponding foot as far as a coupling claw which projects substantially horizontally towards the fixed section. The coupling lock of each of the third and fourth feet may be movable between at least a locked position, where the coupling claws of the first and second jaw parts of the coupling lock protrude respectively under the longitudinal edges of the corresponding fixed section, thus preventing at least vertical separation of the corresponding foot from the corresponding fixed section, and a withdrawn position where the first and second jaw parts of the coupling lock are sufficiently separated from the corresponding fixed section to enable vertical separation of the corresponding foot from the corresponding fixed section. The fixed section may have a T-cross section comprising two horizontal branches which constitute said longitudinal edges. The fixed section and the first and second jaw parts of the first foot may have cam surfaces adapted to engage together for temporarily moving the coupling lock to its withdrawn position when the seat is engaged vertically on said fixed section. The seat assembly may further include a guide rail lock which is movable between a locked position where the guide rail lock engages with the fixed gection to prevent longitudinal movement of the seat and an unlocked position where the guide rail lock does not interfere with the fixed section. The guide rail lock and the coupling lock may be connected together by coupling means adapted so that when the coupling lock and the guide rail lock are both in their locked positions, at least the first jaw part is clamped against the fixed section and so that when the guide rail lock is moved into its unlocked position, the first jaw part is sufficiently separated from the fixed section released to enable longitudinal movement of the seat, the coupling claw remaining engaged under said longitudinal edge of the fixed section. The guide rail lock and the coupling lock may be connected together by coupling means adapted so that the guide rail lock is in locked position when the coupling lock is in its withdrawn position and so that the coupling claw of the coupling lock is engaged under the longitudinal edge of the fixed section of the first guide rail when the guide rail lock is in its locked position. The guide rail lock may be controlled by the control device and a transverse control shaft may be pivotally mounted on the seat, and a guide rail control cam may be fixed on the transverse control shaft. The guide rail control cam may control the guide rail lock.

In some embodiments, the seat assembly may further include a second guide rail having a fixed section which is integral with the vehicle floor and which extends in the longitudinal direction. The fixed section of the second guide rail may comprise a longitudinal edge and the seat may further comprise second, third and fourth feet. The second foot may be removably assembled on the second guide rail in correspondence with the first foot, the third and fourth feet may be removably connected in mutual correspondence respectively to the first and second guide rails, and each of the second, third and fourth feet may include a coupling lock which is movable between a locked position where said coupling lock engages with the corresponding guide rail to prevent removal of the seat from the first and second guide rails, and a withdrawn position where the coupling lock does not interfere with the corresponding guide rail and enables the seat to be removed from the first and second guide rails. The second foot may further comprise a guide rail lock which is movable between a locked position where the guide rail lock engages with the second guide rail to prevent longitudinal movement of the seat and an unlocked position where said guide rail lock does not interfere with the second guide rail and enables longitudinal movement of the seat. The seat may further comprise first, second and third control parts which are actuatable by a user. The first control part may be adapted to move the coupling locks of the first and second feet and the guide rail lock simultaneously into their respective withdrawn and unlocked positions, the second control part may be adapted to move the guide rail locks of the first and second feet into their unlocked position, and the third control part may be adapted to move the coupling locks of the third and the fourth feet simultaneously into their withdrawn positions. The coupling locks of the feet may be resiliently assisted to their locked positions and at least the coupling locks of the third and fourth feet may be adapted to enable free longitudinal movement of the seat when the coupling locks of the third and fourth feet are in their locked positions.

In some embodiments, the seat assembly may further comprise an additional foot that is removably connected to the first guide rail by a coupling lock which is pivotally connected to the additional foot about an additional jaw rotation axis, which is parallel to the longitudinal direction. The jaw part may extend downward from the additional foot to a coupling claw and the coupling lock of the additional foot may be movable between a locked position where the coupling claw of the additional foot engages under the longitudinal edge of the fixed section, thus preventing vertical separation of the first foot from the fixed section, and a withdrawn position where the coupling lock of the additional foot enables vertical separation of the additional foot from the fixed section. The additional foot may further comprise a flexible sliding pad which rests on the fixed section and which is adapted to hold the coupling claw of the additional foot in contact under the longitudinal edge of the fixed section while the seat is not occupied by a passenger, and to be compressed when the seat is occupied by a passenger so that the coupling claw of the additional foot does not interfere then with the longitudinal edge of the fixed section. The coupling claw of the additional foot may be covered at least partially by a lining of flexible material which is adapted to come into contact under the fixed section while the seat is not occupied by a passenger.

BRIEF DESCRIPTION OF THE DRAWINGS

Other characteristics and advantage of the invention will appear during the following description of several embodiments, given as non-restrictive examples, with reference to the attached drawings.

On the drawings:

FIG. 2 is a detail view of one of the front feet and the corresponding guide rail of the seat assembly of FIG. 1, FIG. 3 is a section view along the line III—III of FIG. 1, FIG. 4 is a section view along the line IV—IV of FIG. 1, FIG. 5 is a detail view showing the coupling lock of one of the front feet, in a position where it enables sliding of the seat, FIG. 6 is a view similar to FIG. 1, for a second embodiment of the invention, FIGS. 7 and 8 are detail views of one of the seat feet, respectively in a third and in a fourth embodiment of the invention, FIG. 9 is a perspective view of a seat assembly according to a fifth embodiment of the invention, FIG. 11 is a perspective detail view of some components visible in FIG. 10, FIGS. 12 and 13 are similar views to FIG. 10, respectively in the sliding position of the seat along the guide rails and in a position enabling the seat to be removed from the guide rails.

FIG. 15 is a side view of the seat assembly of FIG. 9,

MORE DETAILED DESCRIPTION

Figure 1:
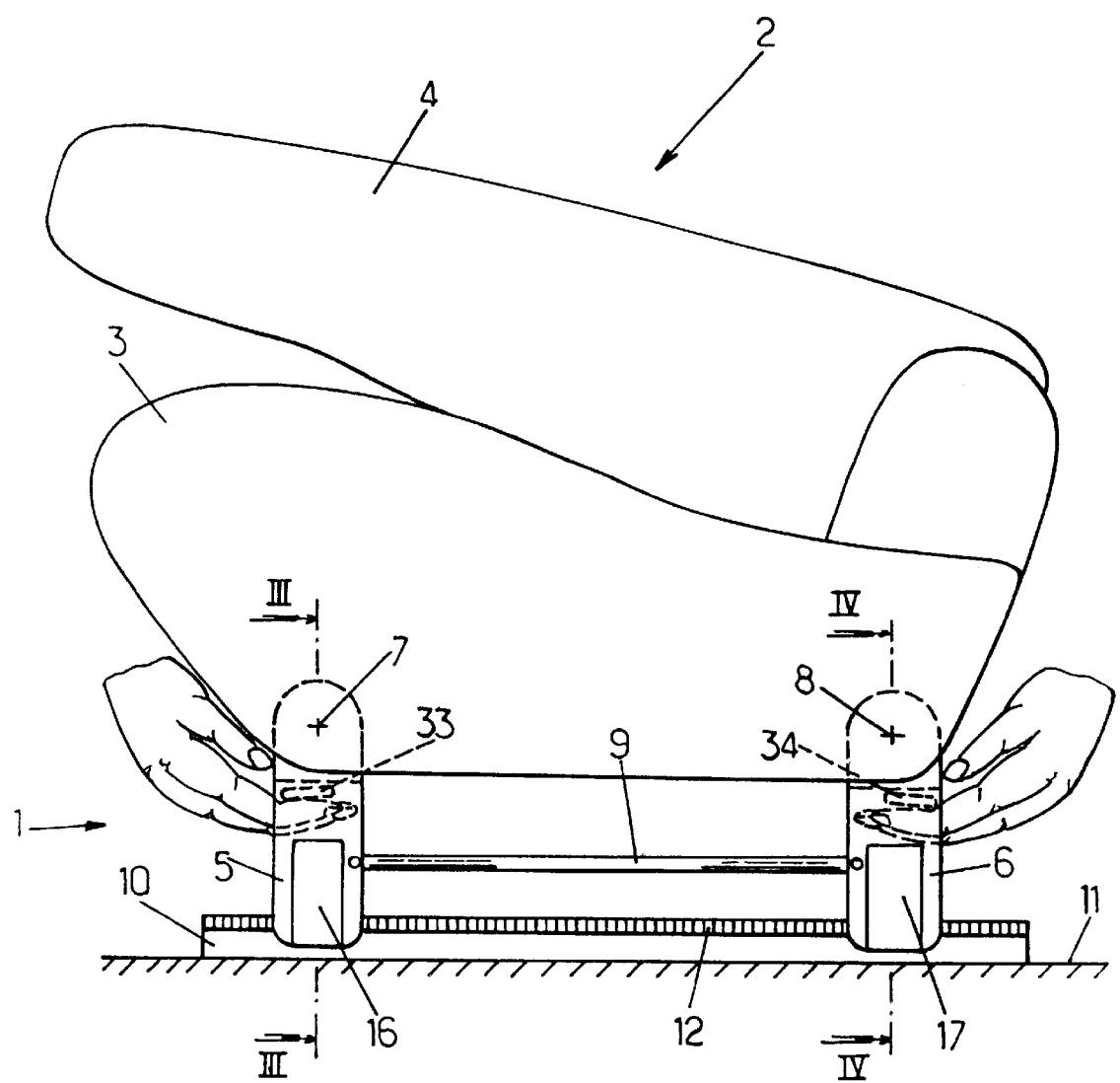
FIG. 1 is a side view of a seat assembly according to a first embodiment of the invention.

In the different figures, the same references designate identical or similar components. FIG. 1 shows a vehicle seat assembly 1, comprising

- a seat 2 which includes a seat bottom 3 and a back 4 shown here in the frontward folded down position, the seat 3 resting on four feet, i.e. a pair of front feet 5 and a pair of rear feet 6, the front feet 5 being preferably pivoted on the seat 3 about a first transverse horizontal axis 7, the rear feet 6 being preferably pivoted on the seat 3 about a second transverse horizontal axis 8, and the front and rear feet located on the same side of the seat being preferably connected together by a horizontal rod 9 which is articulated on the two feet, for reasons which will be explained below,
- and two parallel guide rails which are fixed to the vehicle floor 11 and which enable the sliding of the seat 2 frontward or backward in a so-called longitudinal direction, each guide rail supporting the two feet 5, 6 which are located on the same side of the seat.

As can be seen in FIGS. 1 and 2, each guide rail 10 consists of a fixed section which is preferably set in a channel (not shown) arranged in the vehicle floor.

This fixed section 10, which is preferably a solid metal section made for example in light alloy, has an approximately T section, the edges of the horizontal branch of the T each being constituted by a set of teeth 12 formed by vertical grooves.

Each front 5 or rear 6 foot is engaged on the fixed section 10 by vertical fitting, the foot having a lower part or support part 13 which has a downward opening rigid fork shape and which engages on the corresponding fixed section thus preventing the movement of the seat in the transverse horizontal direction.

In addition, as can be seen in FIGS. 3 and 4, each foot 5, 6 includes a coupling lock in the shape of a jaw, respectively 14 and 15, comprising two jaw parts 16, 17 which are each articulated on the corresponding feet 5, 6 about a horizontal longitudinal axis and which each extend downwards as far as a free end provided with a coupling claw, respectively 18, 19.

This claw projects horizontally towards the corresponding fixed section 10, and it is adapted to engage under the horizontal branch of the T section of this fixed section when the coupling lock 14, 15 is in a so-called locked position, where the free ends of the jaw parts 16, 17 are brought toward one another.

Each coupling lock 14, 15 is in addition assisted to its locked position by a traction spring, respectively 20, 21, which is assembled between the two fastening parts under their rotational axes.

In this way, the coupling locks 14, 15 normally prevent the seat 2 from being raised from the fixed sections 10 by a straightforward upthrust.

In addition, the upper part of the fixed sections 10 have lateral cam surfaces 22, and the free ends of the jaw parts 16, 17 also have complementary cam surfaces 23, 24, so that the seat 2 can be engaged on the fixed sections 10 by straightforward vertical fitting, without having to activate any control means.

In addition, a portion of the internal faces of the front feet jaw parts 16 comprise sets of teeth 25 adapted to engage in sets of teeth 12 on either side of each fixed section 10, so that, in the locked position of the front coupling locks, the seat 2 cannot slide longitudinally on the fixed sections 10.

On the other hand, preferably, the internal faces 26 of the rear jaw parts 17 are smooth, so as not to interfere with a possible sliding of the seat 2 in the longitudinal direction.

Finally, the two jaw parts 16, 17 of each coupling lock comprise meshing toothed pinions 27, 28, so that the two jaw parts are simultaneously close to the fixed section 10 or simultaneously laterally separated from aforesaid section.

One of the two jaw parts is connected by means of a rigid rod, respectively 29, 30, with a rocker arm 31, 32 activated by a lever 33, 34, the front lever 33 and the front rocker arm 31 being common to the two coupling locks of the front feet 5, and the rear lever 34 as well as the rear rocker arm 32 being common with the coupling locks of the two rear feet 6.

Thus, by activating the levers 33 and 34, the coupling locks 14,15 are moved into a withdrawn position where their coupling claws 18, 19 no longer interfere with the fixed sections 10, so that the seat 2 can be raised.

It will be noted that, by preference, the feet 5, 6 are assembled on the seat 3 with friction or have possibly an angular ratchetting position corresponding to their normal use position, so that the feet do not bang about freely after raising the seat 2.

In addition, it is also possible to only unlock the coupling locks of the front feet 5 or only the coupling locks of the rear feet 6, so as to put the seat 2 in a "pocketbook" position, by placing the seat 3 of the seat in a raised position by pivoting about the transverse horizontal axis 7 or 8 of the feet which remain fixed to the fixed sections 10.

In this position, the rods 9 pivot the two rear feet 6 which are disengaged from the fixed section 10, so that these two feet are arranged along the under face of the seat 3.

Finally, when the passenger of the seat 2 wishes to adjust the longitudinal position of this seat on the fixed sections 10, he or she pulls on a lateral lever 35 which, in the example considered here, is connected to the front rocker arm 31 by a rod 36.

This lever can cause the rocker arm 31 to rotate only over a limited travel, so as to move the front coupling locks 14 into a so-called sliding position, halfway between their locked and withdrawn positions.

As shown in FIG. 5, in this position, the internal set of teeth 25 of the jaw parts 16 are disengaged from the set of teeth 12 of each fixed section, but the claws 18 remain engaged under the horizontal branch of the T section of aforesaid fixed section.

In this position, the seat 2 can slide freely frontward or rearward, since the rear coupling locks 15 do not interfere with this sliding, but the seat 2 does not risk disengaging upwards from the fixed sections 10 since it is restrained by the claws 18, 19.

Of course, the invention is not limited to the precise embodiment which will be described.

In particular, as shown in FIG. 6, the lower parts of the fork shaped support part 13 of the front feet 5 may extend longitudinally rearward so as to cover the fixed sections 10 between the front and rear feet, so as to promote a reliable sliding of the seat 2 on aforesaid fixed sections.

In this embodiment, it is not possible to put the seat 3 in a vertical position by pivoting about the transverse horizontal axis 7 of the front feet.

Moreover, as shown in FIG. 7, the jaw parts 16 of the front feet 5, the same as the jaw parts 17 of the rear feet 6, can also be controlled by a cam 37 which is arranged under the rotational axes of the jaw parts and which is adapted to separate these jaw parts when it is activated by control means, which can be identical or similar to those described previously.

The rest of the seat assembly is moreover identical or similar to that which has been described above, apart from the upper ends of the jaw parts 16, 17 not comprising pinions 27, 28.

Finally, as shown in FIG. 8, the springs 20, 21 of the coupling locks 14, 15 could be arranged above the rotational axes of the jaw parts 16, 17 thus tending to move the coupling locks into their withdrawn position. The cam 37 is then also arranged above the rotational axes of the jaw parts 16, 17 by acting against the internal faces of these jaw parts in order to normally hold the coupling locks in their locked position. The intentional angular movement of this cam, for example by means of a rotary handle arranged on each foot or by other control means, has then the effect of enabling the coupling locks 14, 15 to move into their withdrawn position under the force of the springs 20, 21.

In the fifth embodimen tof the invention, which is shown in FIGS. 9 to 15, the seat assembly 1 still includes a seat 2 provided with a seat bottom 3 and a back 4 (see FIG. 9), the seat 3 resting on four feet, i.e. a front pair of feet 5 and a rear pair of feet 6.

As previously, the front feet 5 are preferably pivoted on the seat 2 about a first transverse horizontal axis 7 and the rear feet 6 are preferably pivoted on the seat about a second transverse horizontal axis 8.

Moreover, as in the examples described previously, the seat assembly comprises besides two parallel guide rails 10 which are fixed in the floor 11 of the vehicle and preferably entirely integral with this floor so that for the vehicle users, these guide rails 10 are shown externally only in the shape of a slot 10a arranged in the floor.

Each guide rail 10 carries two feet 5, 6 which are located on the same side of the seat so as to enable sliding of the seat frontward or rearwards in the longitudinal direction.

Figure 10:
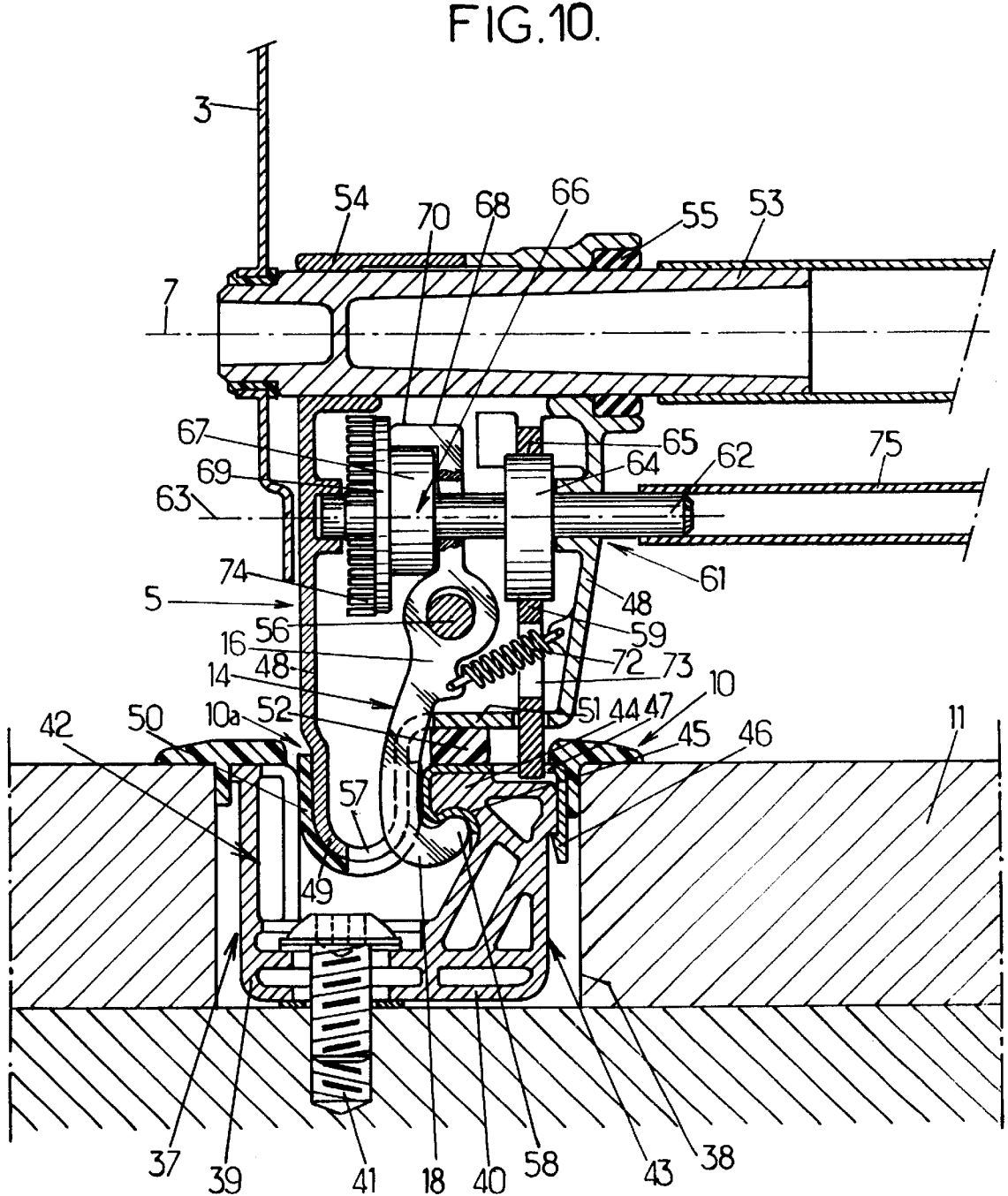
FIG. 10 is a transverse vertical section view of one of the front feet belonging to the seat assembly of FIG. 9, in the locked position on a guide raiil.
Figure 12:
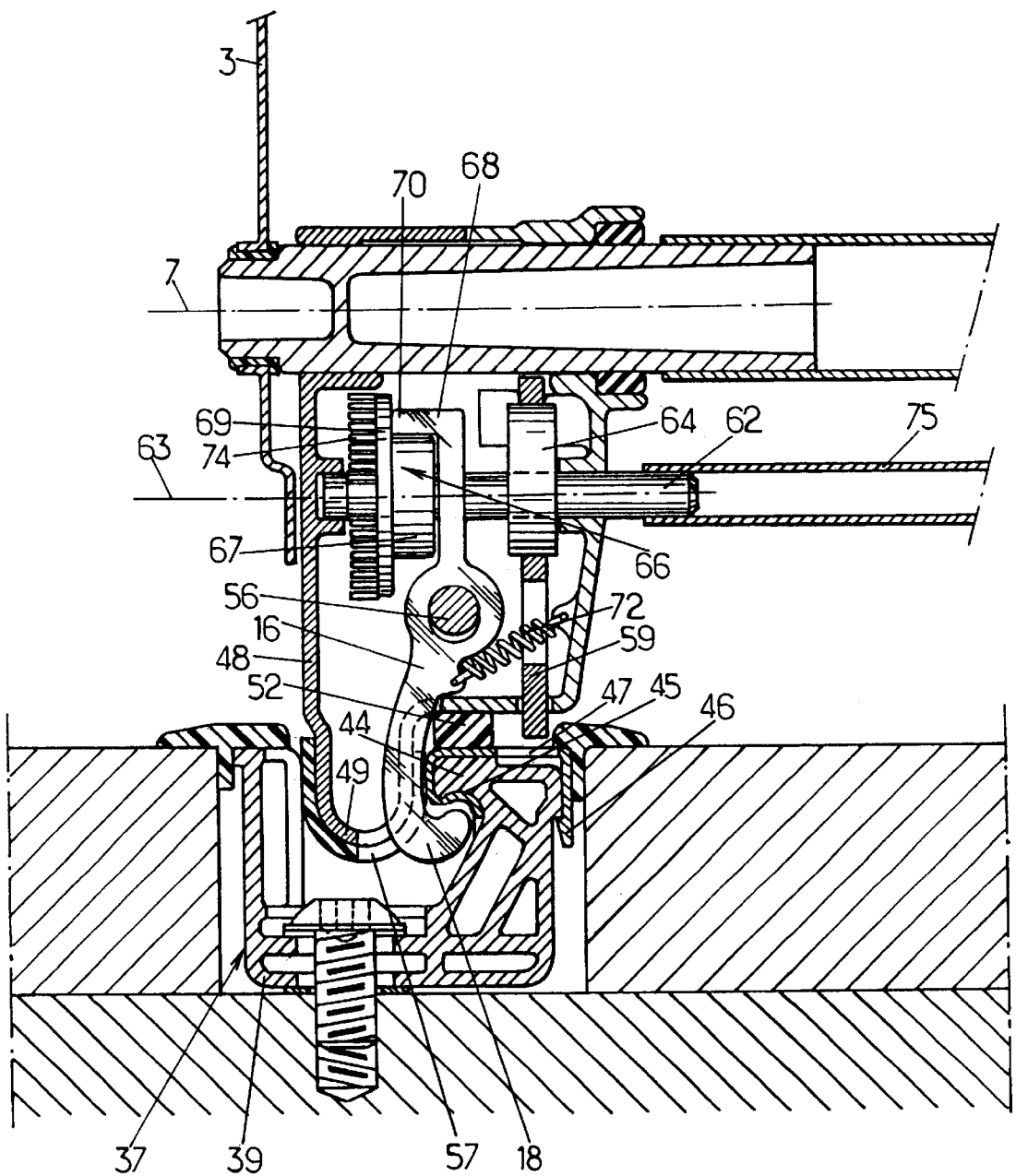

As can be seen in FIG. 10, each guide rail 10 consists of a fixed section which has a upwards opening U section, and which is housed in a channel 38 arranged in the vehicle floor 11.

The fixed section 37 comprises a horizontal base 40 fixed to the floor by screws 41 or similar, and two vertical webs 42, 43, the web 43 which is arranged towards the inside of the seat having an upper horizontal longitudinal edge 44 positioned inside the U, which edge has to advantage a slight lower groove 45.

Advantageously, the fixed section 37 includes
 a sectioned body 39 preferably made from a light aluminum based alloy, this body 39 itself having a U section,
 and a folded steel sheet 46 which fits the upper part of the web 43 by also following the shape of the edge 44 and its lower groove 45, this folded sheet 46 having notches 47 distributed along the length of the sheet 46 (also see FIG. 11).

Moreover, each foot 5, 6 comprises a rigid hollow body 48 which includes a lower guide pin 49 penetrating with a small clearance between the vertical webs 42, 43 of the fixed section 37, the guide pin 49 being preferably provided with an external plastic material lining 50 in order to limit friction and noises by contact with the fixed section.

The external body 48 of each foot 5, 6 further comprises besides an approximately horizontal internal face 51, on top of the edge 44 of the corresponding fixed section, said horizontal internal face 51 being provided with a plastic or other material sliding pad 52 (preferably slightly flexible and compressible), or if the need arises a bearing part, in order to facilitate the sliding of the seat along the fixed sections.

Furthermore, each foot 5, 6 is pivoted about a fixed hub 53 which is integral with the bottom seat bottom 3 and which extends along the corresponding pivoting axis 7, 8.

Preferably, the pivoting of the foot 5, 6 about the fixed hub 53 is obtained by means of two bearings, laterally displaced, i.e.:
 a first bearing 54 which enables a pivoting approximately without clearance about the hub 53,
 and a second bearing formed by an elastomer race 55 which enables the feet 5, 6 to have some angular movement about a longitudinal horizontal axis parallel to the fixed section 37, thus facilitating the making good of alignment faults of the guide rails along the transverse horizontal direction (perpendicular to the guide rails), during installation of the seat 2 on the vehicle floor 11.

Furthermore, the external body 48 of each front foot 5 comprises internally:
 a coupling lock 14, formed in this case by a jaw part 16, which is pivoted with some vertical clearance about a rod 56 which is integral with the body 48 of the foot and which extends in the longitudinal direction, this jaw part 16 extending downwards through a slot 57 in the external body 48, as far as a claw 18 which projects laterally toward the vertical web 43 of the fixed section and which is adapted to engage under the edge 44 of this section (the claws 18 of the two front feet 5 are therefore mutually opposite), aforesaid coupling claws ending preferably in a raised nose 58 which is adapted to engage in the groove formed under the edge 44 of the fixed section,
 and a guide rail lock 59 which is vertically movable relative to the body 48 of the corresponding foot 5 and which comprises one or several lower teeth 60 adapted to engage in notches 47 of the folded sheet 46, as can be seen in FIGS. 10 and 11, the guide rail lock 59 being able to be for example assembled vertically sliding on the external body 48 of the foot.

The coupling lock 14 and the guide rail lock 59 of each foot 5 are activated by the same control device 61 belonging to the considered foot.

This control device includes: control shaft 62 pivoted on the foot 5 about a transverse horizontal axis 63,
 a first eccentric disc 64 which is fixed on the control shaft 62 and which forms a guide rail control cam 64, this disc being housed approximately without vertical clearance in an oblong aperture 65 belonging to the guide rail lock 59, this oblong aperture 65 being elongated in the longitudinal horizontal direction,
 a second eccentric disc 66 which is fixed on the control shaft 62 and the external radial periphery of which forms cam 67 on top of which is supported an edge 68 formed at the upper end of the jaw part 16, which upper end is transversed by the control shaft 62 with some vertical clearance, a collar 69 against which the end 70 of the edge 68 abuts, this collar 69 forming an axial cam surface having a ramp 71 (FIG. 11), the ramp 71 and the cam 67 being called below first and second coupling control cams, a spring 72 which connects the jaw part 16 with one of the walls of the external body 48 of the foot 5, for example by passing through an aperture 73 of the lock 59, so as to assist the jaw part 16 into a locked position where the coupling claw 18 of this jaw part is engaged under the edge 44 of the fixed section, and a spring 74, particularly a coiled spring, which connects the control shaft 62 to the external body 48 of the foot, in order to assist aforesaid control shaft towards a first angular position.

In this first angular position:

the guide rail control cam 64 causes the guide rail lock 59 to lower into a locked position where the teeth 60 of aforesaid lock are engaged in the notches 47 of the fixed section, the ramp 71 of the collar 70 is not connected with the edge fo the jaw part so that the claw 18 of the jaw part 16 is under the edge 44 of the fixed section, and cam 67 engages with the edge 68 of the jaw part 16 in order to move this jaw part upwards by applying the nose 58 of its coupling claw into the groove 45 of the fixed section, so as to clamp the sliding pad 52 between the external body 48 of the foot 5, 6 and the fixed section.

From the first angular position or the rest position shown in FIG. 10, the control shaft 62 of each foot can pivot as far as a second angular position enabling the seat 2 to be slid frontward or rearwards in the guide rails 10 without allowing the raising of the seat, or as far as a third angular position enabling the foot 5 in question to separate from the corresponding guide rail 10. When the control shaft 62 has pivoted through a certain angle α in a pre-specified angular direction from its first angular position, aforesaid control shaft is in its second angular position, shown in FIG. 12.

In this position:

the guide rail control cam 64 raises the guide rail lock 59 as far as an unlocking position where it does not engage with the notches 47 of the fixed section, the second coupling control cam 67 enables the jaw part 16 to move downwards on the rod 56 (the spring 72 makes this movement possible), so that the jaw part 16 is then in a socalled sliding position where the jaw part is separated from the fixed section 37 by some clearance, and the ramp 71 of collar 69 does not always engage with the end 70 of the edge 68, so that the claw 18 of the jaw part 16 remains always engaged under the edge 44 of the fixed section.

Figure 13:
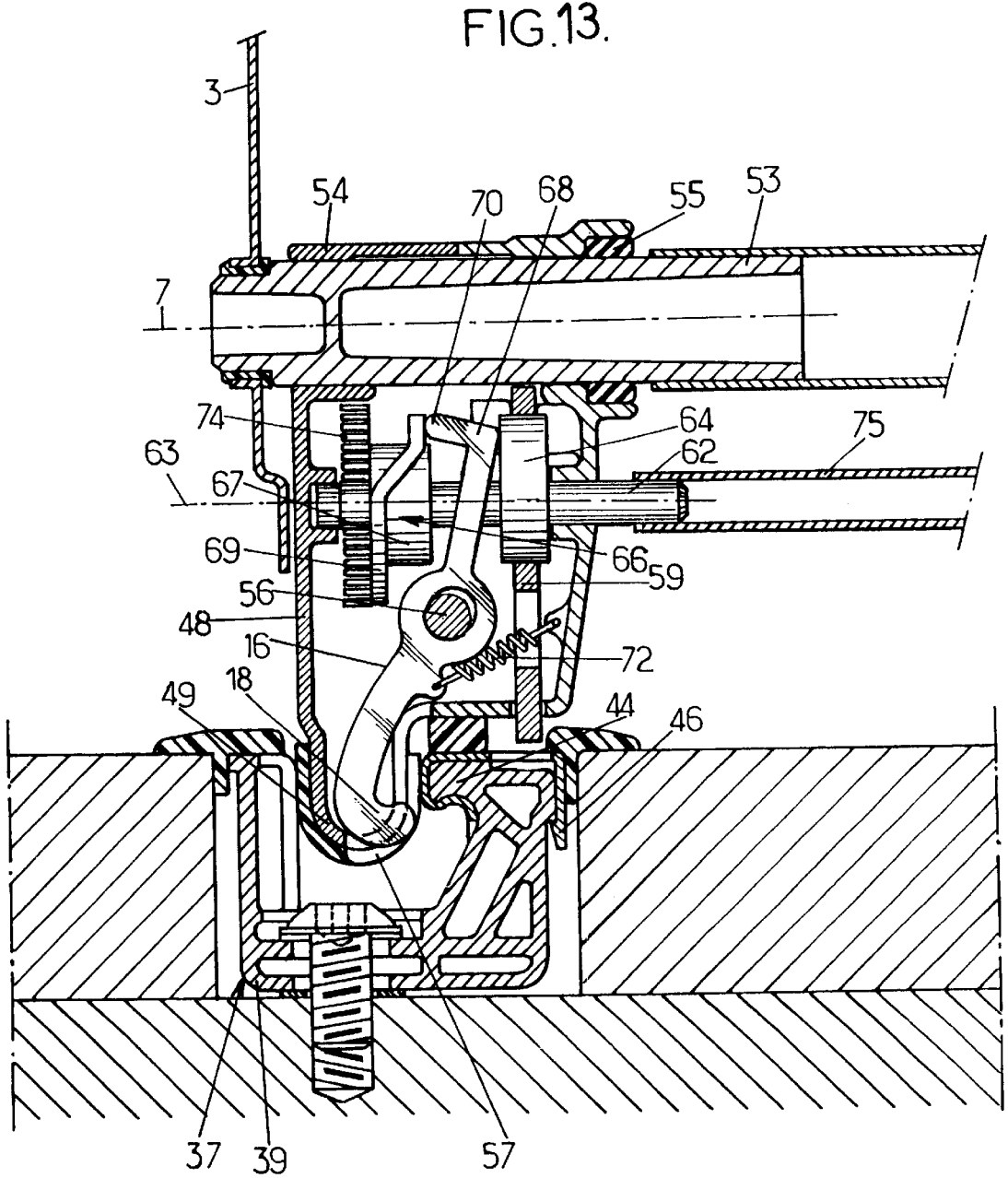

When the control shaft 62 pivots over an angle β greater than the angle α in angular direction from its first angular position, as far as the third angular position shown in FIG. 13:

the guide rail control cam 66 holds the guide rail lock 59 in the unlocked position, and the ramp 71 of the collar 69 is axially supported on the end 70 of the edge 68, by pivoting the jaw part 16 to the inside of the guide pin 49 through the slot 57, to a position where the claw 18 of the jaw part no longer projects under the edge 44 of the fixed section and thus enables the foot 5 to separate from the guide rail.

Figure 14:
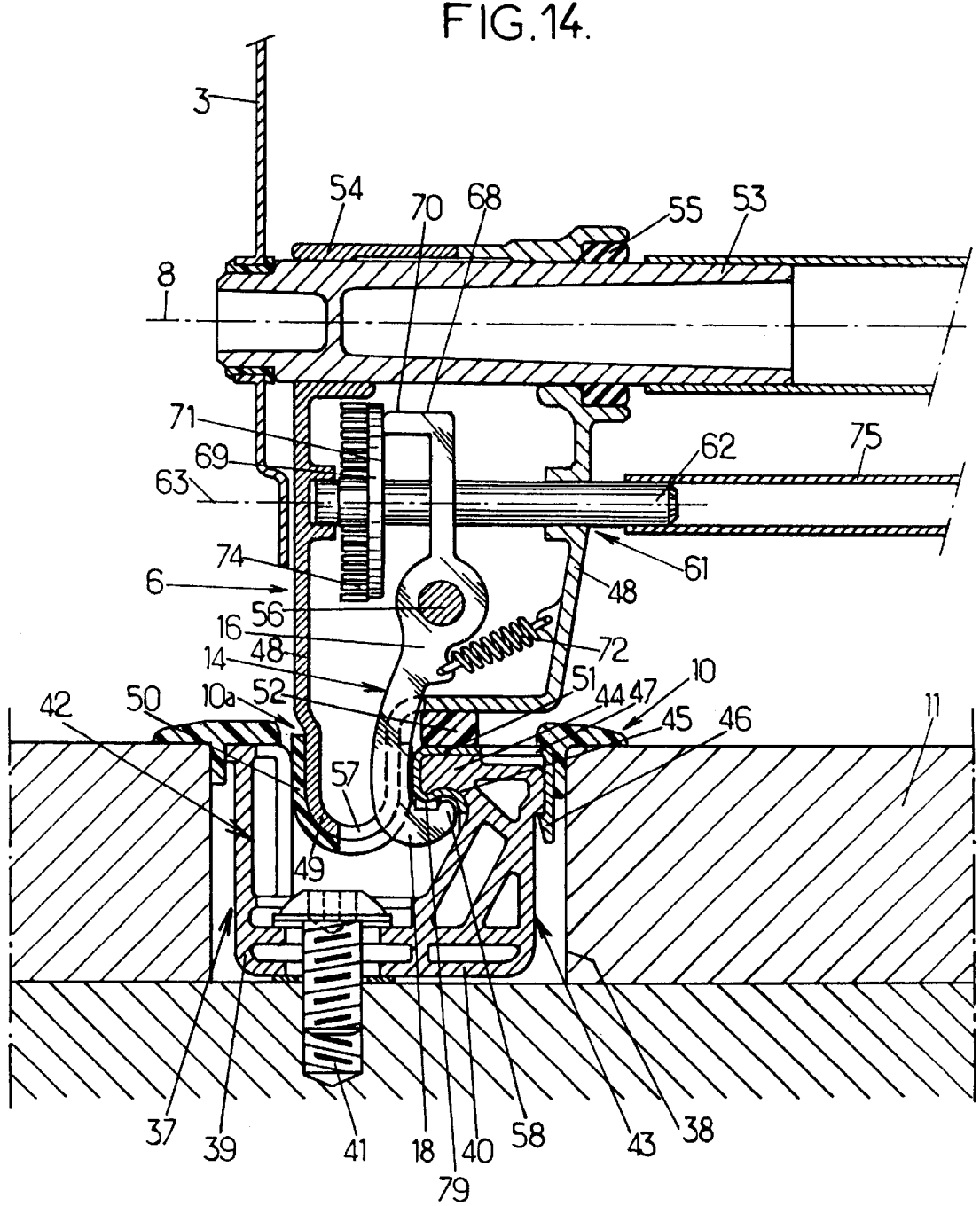
FIG. 14 is a similar view to FIG. 10 for one of the rear feet of the seat.

Each rear foot 6 is similar to the front foot 5 described above, and should even be identical to aforesaid front foot. However, preferably, the rear feet are distinguished from the front feet by the following differences (as seen in FIG. 14):

the jaw part 16 is preferable pivoted without vertical clearance on the longitudinal rod 56, the foot 6 does not comprise the second disc 66, the claw 18 comprises an upper lining 79 in plastic material or other relatively flexible material, which is interposed vertically between aforesaid claw 18 and the under face of the edge 44 of the fixed section when the jaw part 16 is in the locked position, and the foot 6 does not comprise a guide rail lock nor a guide rail control cam 64.

When the jaw part 16 of the rear foot is in the locked position, the claw 18 of this jaw part is not normally in direct contact with the fixed section, since said claw is separated from the fixed section by the lining 79.

On the other hand, in the event of the vehicle in which the seat is assembled being subjected to an accident, the lining 79 is crushed and the claw 18 comes into intimate contact with the bottom of the groove 45 which is arranged under the edge 44 of the fixed section.

The control shaft 62 of each rear foot is only moved between the first and third aforementioned angular positions, in order to place the corresponding coupling lock 14 either in its vertical position shown in FIG. 14, or in an unlocked position similar to the position shown in FIG. 13 for the front foot 5.

Thus when the control shafts 62 of the front feet 5 of the seat are placed in their second angular position in order to enable the sliding of the seat frontward or rearward along the guide rails 10, the jaw parts 16 of the rear feet 6 are left in their unlocked position, and the sliding of the rear feet 6 along the guide rails 10 is obtained simply by sliding of the pad 52 and the linings 50 and 79 along the fixed section 37.

Advantageously, this sliding is moreover facilitated by some crushing of the pad 52 when the seat is occupied by a passenger, this slight crushing bringing about a vertical clearance between on the one hand, the edge 44 of the fixed section, and on the other hand, the claw 18 and the lining 79 of the jaw part 16.

As a variant, the control shafts 62 of the front feet 5 should the need arise also move together only between the first and third aforementioned angular positions, corresponding respectively to the locked and unlocked positions of aforesaid jaw parts.

In this case, the front feet 5 would not comprise an eccentric disc 66 and their jaw parts 16 would be preferably assembled without vertical clearance on the corresponding rods 56, and the claws 18 of the front feet would be preferably provided with the aforementioned linings 79.

The sliding of the front feet 5 along the guide rails would be then obtained only by sliding the pad 52 and the linings 50 and 79 of each front foot along the corresponding fixed section, preferably with a slight crushing of the pad 52 as explained above for the rear foot 6.

Advantageously, the control shafts 62 of the two front feet 5 are fixed together by means of a rigid connecting bar 75 in particular tubular, the same as the control shafts 62 of the two rear feet 6. The control devices of the front feet 5 or the rear feet 6 are preferably activated by means of these connecting bars.

As a non-restrictive example, as shown in FIG. 15, each of the front and rear connecting bars 75 can have an angled part forming a compensator 76 extending rearwards and accessible to a user.

The front compensator 76 can pivot upwards in the direction of the arrow 78, over the angle β, by moving the control shafts 62 of the two front feet 5 as far as their third angular position enabling aforesaid front feet to separate from the guide rails 10, whereas the rear compensator 76 can pivot upwards by the same angle β in the direction of the arrow 78, to pivot the control shafts 62 of the rear feet 6 to their third angular position, thus enabling the rear feet 6 to separate from the guide rails 10.

When the front and rear compensators 76 are activated at the same time, the seat 2 can be completely raised in order for it to leave the vehicle or to arrange it in another location in the vehicle, and when only the rear compensator 76 is activated, the seat 2 can be pivoted on its front feet in order to place it in the "pocketbook" position, i.e. with its seat bottom 3 arranged approximately vertical.

Furthermore, in order to adjust the longitudinal position of the seat 2, the control shafts 62 of the front seats only can be pivoted through the aforementioned angle a in order to place them in their second angular position.

With this purpose, the seat 2 can include further an additional compensator 80 which is formed for example by an angled tube 81 pivoted on the two front feet 5, and which is positioned towards the front.

This compensator 80 is integral with a cam 82 adapted to engage with a complementary cam 83 integral with the connecting bar 75 of the front feet in order to drive said connecting bar in the said angular direction 78 when the compensator 80 pivots in direction 77;

The tube 81 is assembled on the front feet 5 so as to be able to pivot only with an angular clearance β, or at least only with an angular clearance adapted so that the connecting bar 75 pivots only by the angle β in the angular direction 77 when the compensator 80 is activated.

Figure 16:
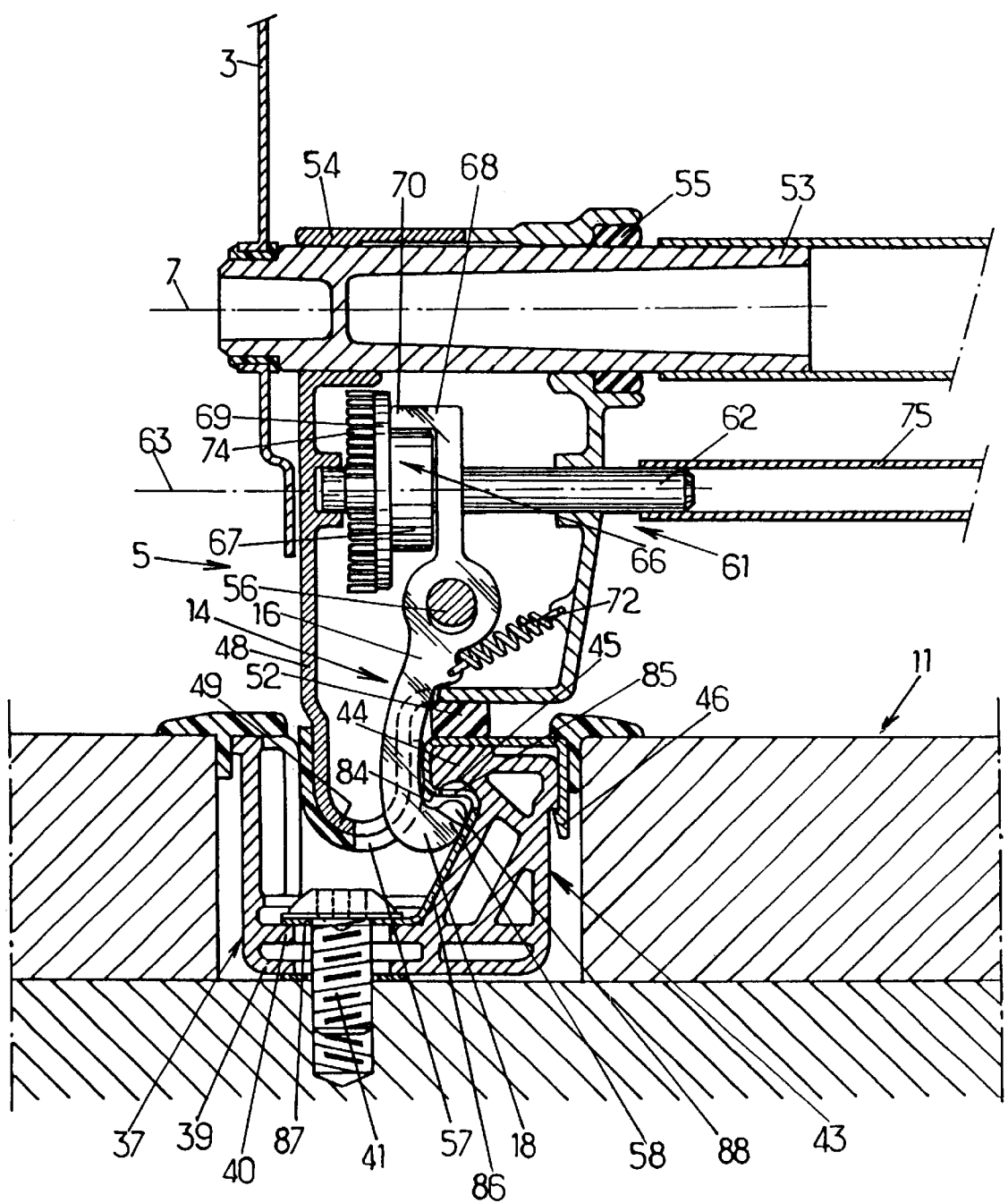
FIG. 16 is a view similar to FIG. 12, in a sixth embodiment of the invention.
Figure 17:
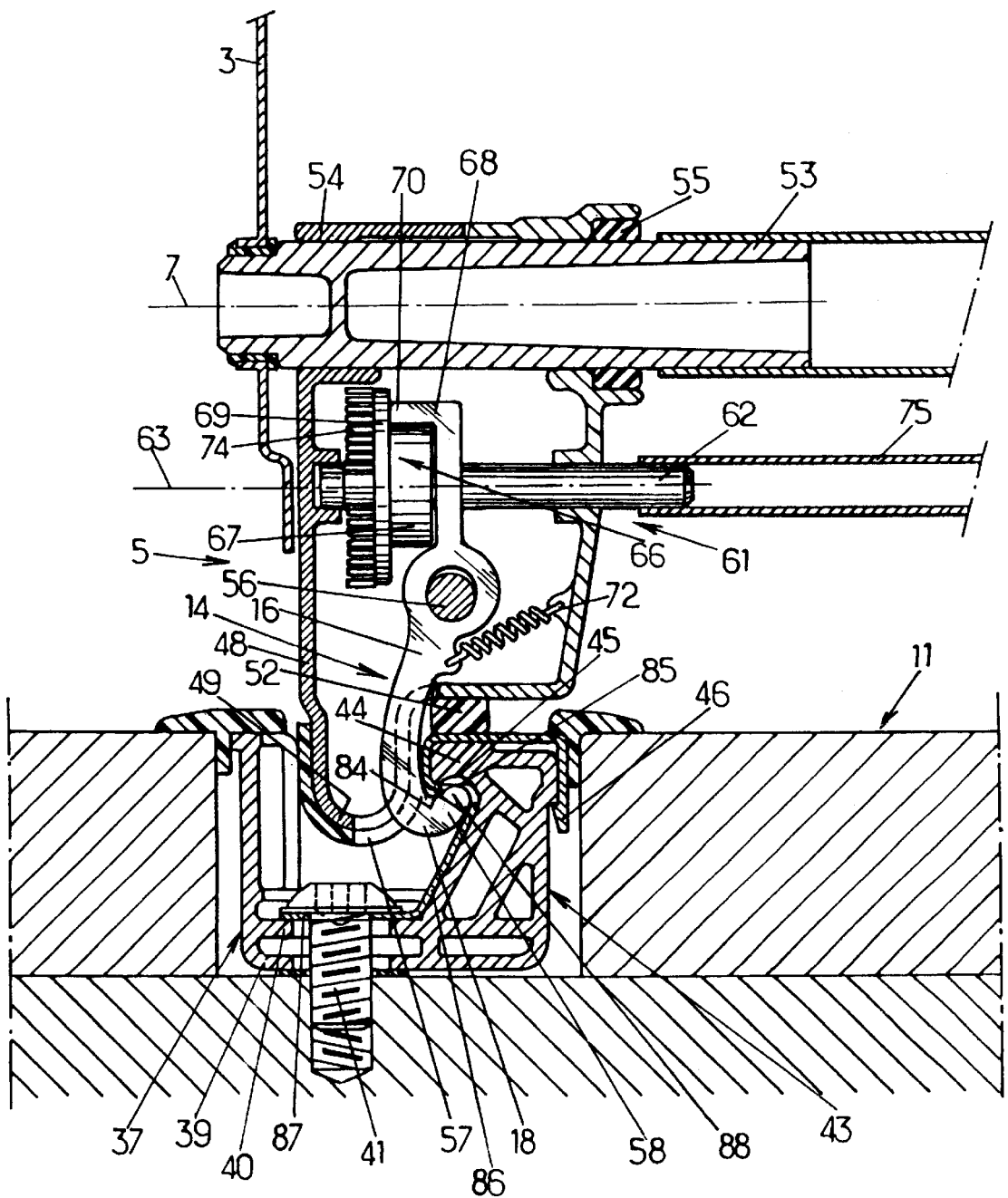
FIGS. 17 and 18 are views similar to FIG. 16, respectively in the locking position and in a position enabling the seat to be removed from the guide rails.
Figure 18:
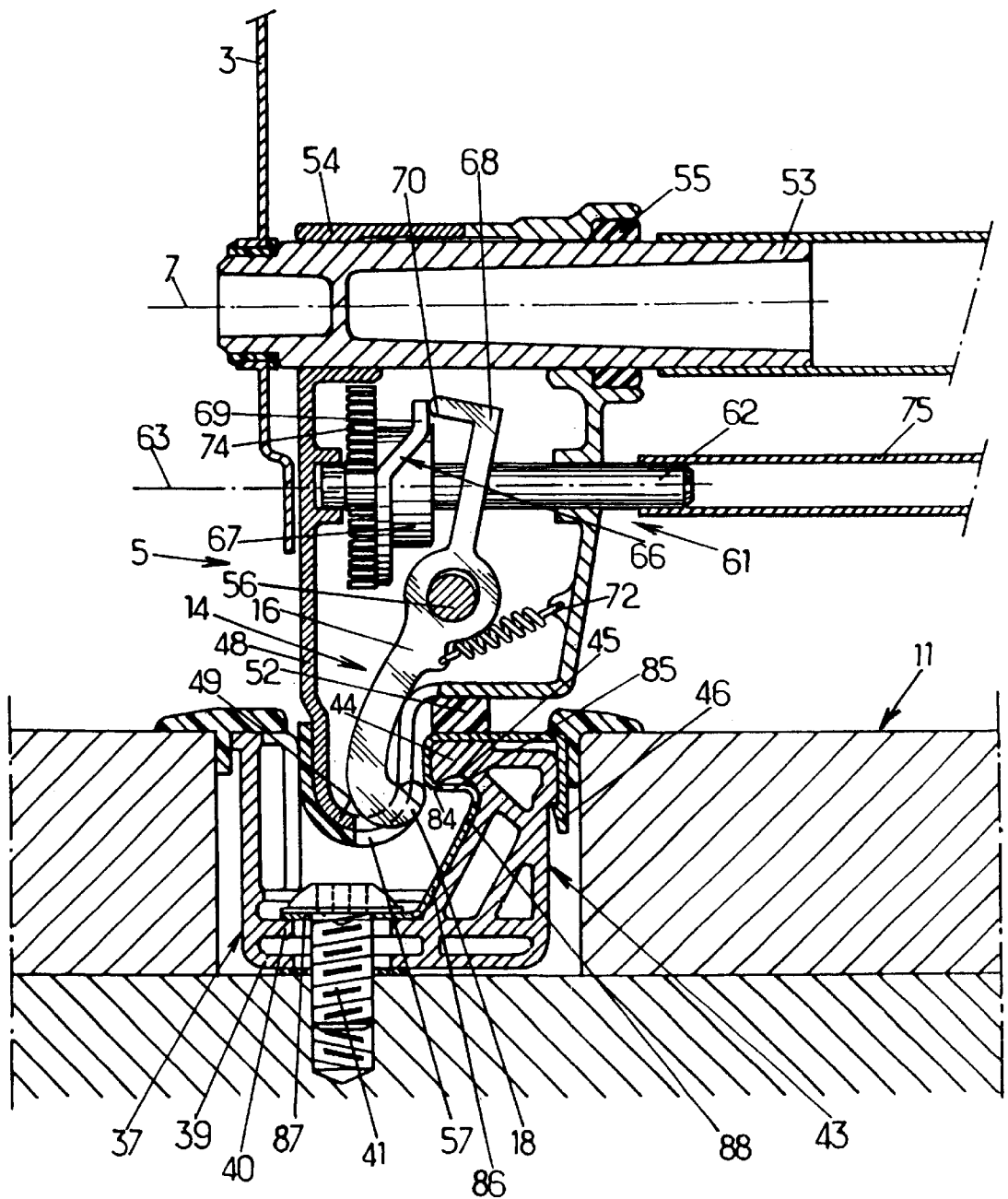

The sith embodiment of the invention, shown in FIG. 16, is similar to the embodiment shown in FIGS. 9 to 15, and it is distinguished by the following points:

- the folded steel sheet 46 forms a lower horizontal fold 84 which is arranged above the groove 45 and in which are drilled juxtaposed holes forming notches 85.
- the fold 84 is extended downwards by a web plate 86 which borders the internal face of the web 43 of the fixed section,
- the web plate 86 is itself extended by horizontal base 87 which rests on the base 40 of the fixed section and which is fixed to this base by screws 41 serving to fix the fixed section 37 on the vehicle floor,
- the sheet 46 does not comprise notches 47, and the front foot 5 does not comprise the vertical lock 59 nor cam 64,
- and the coupling claws 18 of the front feet comprise teeth 88 adapted to engage in the notches 85 of the folded sheet 46 by penetrating into the groove 45 of the fixed section when the jaw parts 16 are in their locked position.

We claim:

1. A vehicle seat assembly comprising: at least one first guide rail including a fixed section which is intended to be integral with a vehicle floor and which extends in a longitudinal direction, said fixed section comprising a longitudinal edge, and a seat having at least one first foot which is assembled in a removable manner on the guide rail to enable the seat to be vertically detached from the guide rail, said first foot comprising a coupling lock which is movable between a locked position where said coupling lock engages with the guide rail and a withdrawn position where said first foot can separate vertically from the guide rail, said seat having a control device for moving said coupling lock between said locked and withdrawn positions, wherein the coupling lock includes a first jaw part which extends downward from said foot to form a coupling claw, the first jaw part being pivotally mounted about a jaw rotation axis parallel to the longitudinal direction, said coupling lock engaging under said longitudinal edge of the fixed section when the coupling lock is in the locked position, thus preventing vertical separation of said first foot and the fixed section, and said coupling claw being sufficiently separated from the fixed section when the coupling lock is in the withdrawn position so that the coupling claw does not interfere with said fixed section during vertical separation of said first foot and said fixed section, and wherein said longitudinal edge of the fixed section delimits an open space which is situated underneath said longitudinal edge, said open space being arranged to enable said coupling claw to move in said open space during longitudinal movement of the seat.

2. A seat assembly according to claim 1, wherein the first jaw part is adapted to cooperate with the fixed section to prevent longitudinal movement of the seat when said coupling lock is in the locked position.

3. A seat assembly according to claim 2, wherein the control device is adapted to raise the first jaw part for applying the coupling claw of said first jaw part under the longitudinal edge of the fixed section, with clamping, when said first law part is in the locked position, thereby preventing longitudinal movement of the seat.

4. A seat assembly according to claim 3, wherein the fixed section includes notches which are arranged under the longitudinal edge of said fixed section, and wherein the coupling claw has upward directed teeth which are adapted to engage in said notches when the coupling lock is in the locked position, thereby preventing longitudinal movement of the seat.

5. A seat assembly according to claim 3, wherein the control device is adapted for moving the coupling lock between said locked position, said withdrawn position, and an intermediate position where the first jaw part is in a sliding position where the coupling claw of said first jaw part still protrudes under the longitudinal edge of the fixed section, thereby preventing vertical separation of said first foot from said fixed section, but where said first jaw part is sufficiently separated from said fixed section to enable longitudinal movement of the seat.

6. A geat aggembly according to claim 2, wherein said control device includes a transverse control shaft which is pivotally mounted relative to the seat and which is movable between first and second positions corresponding respectively to the locked and withdrawn positions of the coupling lock, the seat assembly further comprising a first control cam which is fixed to said transverse control shaft and which is arranged radially relative to said transverse control shaft, said first control cam being adapted to pivot said first jaw part to a withdrawn position corresponding to the withdrawn position of the coupling lock when the control shaft is in the first position, said first control cam being arranged not to interfere with said first jaw part when the transverse control shaft is in the second position, and the coupling lock being resiliently assisted to the locked position.

7. A seat assembly according to claim 6, wherein said first jaw part is further slidingly mounted within said first foot in a substantially vertical direction, said seat assembly further comprising a second control cam which is fixed to said transverse control shaft and which is arranged radially relative to said transverse control shaft, said second control cam engaging with the first jaw part in order to raise said first jaw part and thus apply the coupling claw of said first jaw part under the longitudinal edge of the fixed section with clamping, when the transverse control shaft is in the first position, and to lower said first jaw part in order to enable longitudinal movement of the seat when the control shaft is in an intermediate position between the first and second positions.

8. A seat assembly according to claim 7, wherein the longitudinal edge of the fixed section has a longitudinal groove facing downward, whereas said coupling claw has a nose which projects upward and which is adapted to engage in said groove when the control shaft is in the first position.

9. A seat assembly according to claim 2, wherein the fixed section comprises a body at least partially made out of aluminum and a folded steel sheet which partially covers the body and which comprises notches, said coupling claw of the first jaw part being adapted to come into engagement with said notches when said coupling lock is in the locked position.

10. A seat assembly according to claim 2, wherein the coupling lock includes only the first jaw part.

11. A seat assembly according to claim 10, further comprising a second guide rail including a fixed section which is similar to the fixed section of the first guide rail, said seat further comprising at least a second foot which is assembled in a vertically removable manner on the fixed section of the second guide rail by an additional first jaw part which has a coupling claw, the coupling claws of the first jaw parts of the first and second guide rails extending in mutually opposite directions.

12. A seat assembly according to claim 10, wherein the fixed section has a substantially upward opening U section with a substantially horizontal base and two substantially vertical webs, one of the webs comprising said longitudinal edge which projects towards the other web, the first jaw part being adapted to penetrate between the webs of the fixed section so that the coupling claw can engage under the longitudinal edge on said fixed section.

13. A seat assembly according to claim 12, wherein said first foot has a guide pin projecting downwards, which is adapted to engage between the webs of the fixed section with little clearance.

14. A seat assembly according to claim 1, wherein said first foot is pivotally mounted on the seat along a transverse horizontal rotational axis in a manner allowing small movements of said first foot perpendicular to said transverse horizontal rotational axis.

15. A seat assembly according to claim 1, wherein the coupling lock further includes a second jaw part, said first and second jaw parts being arranged on either side of the fixed section, the coupling claw of the first jaw part projecting substantially horizontally towards the second jaw part, the coupling lock being adapted so that the fixed section is clamped horizontally between the first and second jaw parts when said coupling lock is in the locked position, thereby preventing longitudinal movement of the seat, and the coupling lock being adapted so that the second jaw part does not interfere with the fixed section when the coupling lock is in the withdrawn position, thereby enabling vertical separation of the first foot from the fixed section.

16. A seat assembly according to claim 15, wherein at least the first jaw part comprises teeth arranged toward the fixed section, said fixed section having complementary teeth which engage with the teeth of the first jaw part to prevent longitudinal sliding of the seat when the coupling lock is in the locked position.

17. A seat assembly according to claim 15, wherein the second jaw part is also movable during movement of the coupling lock between the locked and withdrawn positions, said second jaw part comprising an additional coupling claw which projects substantially horizontally towards the first jaw part and which is engaged under an additional longitudinal edge belonging to the fixed section when the coupling lock is in the locked position, said second jaw part being sufficiently separated from the fixed section when the coupling lock is in the withdrawn position, for said additional coupling claw of the second jaw part not to interfere with the fixed section during vertical separation of said first foot and said fixed section.

18. A seat assembly according to claim 17, wherein the second jaw part comprises teeth arranged toward the fixed section, said fixed section having complementary teeth which engage with the teeth of the second jaw part to prevent longitudinal sliding of the seat when the coupling lock is in the locked position.

19. A seat assembly according to claim 15, wherein the coupling lock has a sliding position, intermediate between the locked and withdrawn positions, where the first and second jaw parts are sufficiently separated from the fixed section to enable longitudinal sliding of the seat, but where at least the coupling claw of the first jaw part still protrudes under the longitudinal edge of the fixed section.

20. A seat assembly according to claim 15, further comprising a second guide rail including a fixed section which is intended to be integral with a vehicle floor and which extends in said longitudinal direction, said fixed section of the second guide rail comprising two opposite longitudinal edges which protrude laterally from said fixed section of the second guide rail, the seat further including a second foot which comprises a coupling lock, said coupling lock of the second foot including first and second jaw parts which are arranged on either side of the fixed section of the second guide rail and which extend downward from the second foot to form respective coupling claws that project substantially horizontally toward the fixed section of the second guide rail, the coupling lock of the second foot being movable by said control device between a withdrawn position where the first and second jaw parts of the second foot are sufficiently separated from the fixed section of the second guide rail so as to enable vertical separation of the second foot from the fixed section of the second guide rail, a locked position where the respective coupling claws of the first and second jaw parts of the second foot are engaged respectively under the two longitudinal edges of the fixed section of the second guide rail and where the fixed section of the second guide rail is clamped horizontally between the first and second jaw parts of the second foot, thus preventing longitudinal movement of the seat as well as vertical separation of the second foot from the fixed section of the second guide rail, and an intermediate position where the first and second jaw parts of the second foot are not clamped against the fixed section of the second guide rail, and where the respective coupling claws of said first and second jaw parts of the second foot are still protruding under the longitudinal edges of the fixed section of the second guide rail, thus enabling longitudinal movement of the seat but preventing vertical separation of the second foot from the fixed section of the second guide rail, said fixed section of the second guide rail being arranged to enable sliding of the coupling claws of the first and second jaw parts of the second foot under the two longitudinal edges of said fixed section of the second guide rail.

21. A seat assembly according to claim 20, further comprising third and fourth feet which are arranged to connect to the respective fixed sections of the first and second guide rails and which are assembled in a removable manner respectively on said fixed sections, each of the third and fourth feet comprising a coupling lock including first and second jaw parts which are arranged on either side of the corresponding fixed section and which each extend downward from the corresponding foot as far as a coupling claw which projects substantially horizontally towards the corresponding fixed section, the coupling lock of each of the third and fourth feet being movable between at least a locked position, where the coupling claws of the first and second jaw parts of said coupling lock of each of the third and fourth feet protrude respectively under the longitudinal edges of the corresponding fixed section, thus preventing at least vertical separation of the corresponding foot from the corresponding fixed section, and a withdrawn position where the first and second jaw parts of said coupling lock of each of the third and fourth feet are sufficiently separated from the corresponding fixed section to enable vertical separation of the corresponding foot from the corresponding fixed section.

22. A seat assembly according to claim 15, wherein the fixed section has a T-cross section comprising two horizontal branches which constitute said longitudinal edge.

23. A seat assembly according to claim 15, wherein the fixed section and the first and second jaw parts of the first foot have cam surfaces adapted to engage together for temporarily moving the coupling lock to the withdrawn position when the seat is engaged vertically on said fixed section.

24. A seat assembly according to claim 1, further including a guide rail lock which is movable between a locked position where said guide rail lock engages with the fixed section to prevent longitudinal movement of the seat, and an unlocked position where said guide rail lock does not interfere with said fixed section.

25. A seat assembly according to claim 24, wherein the guide rail lock and the coupling lock are connected together by coupling means adapted so that when the coupling lock and the guide rail lock are both in the locked position, at least the first jaw part is clamped against the fixed section, and so that when the guide rail lock is moved into the unlocked position, the first jaw part is sufficiently separated from the fixed section released so as to enable longitudinal movement of the seat, the coupling claw remaining then engaged under said longitudinal edge of the fixed section.

26. A seat assembly according to claim 24, wherein the guide rail lock and the coupling lock are connected together by coupling means adapted so that the guide rail lock is in the locked position when the coupling lock is in the withdrawn position and so that the coupling claw of the coupling lock is engaged under the longitudinal edge of the fixed section of the first guide rail when the guide rail lock is in the locked position.

27. A seat assembly according to claim 25, wherein the guide rail lock is controlled by said control device.

28. A seat assembly according to claim 24, wherein a transverse control shaft is pivotally mounted on the seat, a guide rail control cam is fixed on said transverse control shaft, and said guide rail control cam controls said guide rail lock.

29. A seat assembly according to claim 24, further comprising a second guide rail having a fixed section which is intended to be integral with a vehicle floor and which extends in said longitudinal direction, said fixed section of the second guide rail comprising a longitudinal edge, the seat further comprising second, third and fourth feet, the second foot being removably assembled on said second guide rail, in correspondence with the first foot, the third and fourth feet being removably connected in mutual correspondence respectively to the first and second guide rails, each of the second, third and fourth feet including a coupling lock which is movable between a locked position where said coupling lock engages with the corresponding guide rail so as to forbid removal of the seat from the first and second guide rails, and a withdrawn position where said coupling lock does not interfere with the corresponding guide rail and enables the seat to be removed from the first and second guide rails, the second foot further comprising a guide rail lock which is movable between a locked position where said guide rail lock engages with the second guide rail to prevent longitudinal movement of the seat and an unlocked position where said guide rail lock does not interfere with the second guide rail and enables longitudinal movement of the seat, the seat further comprising first, second and third control parts which are actuatable by a user, the first control part being adapted to move the coupling locks of the first and second feet and the guide rail locks simultaneously into their respectively withdrawn and unlocked positions, the second control part being adapted to move the guide rail locks of the first and second feet into their unlocked position, and the third control part being adapted to move the coupling locks of the third and the fourth feet simultaneously into their withdrawn positions, the coupling locks of the feet being resiliently assisted to the locked position and at least the coupling locks of the third and fourth feet being adapted to enable free longitudinal movement of the seat when said coupling locks of the third and fourth feet are in the locked position.

30. A seat assembly according to claim 1, further comprising at least an additional foot which is removably connected to said first guide rail by a coupling lock which is pivotally connected to said additional foot about an additional jaw rotation axis parallel to said longitudinal direction, said additional jaw part extending downward from said additional foot to a coupling claw, the coupling lock of the additional foot being movable between a locked position where said coupling claw of the additional foot engages under said longitudinal edge of the fixed section, thus preventing vertical separation of said first foot from said fixed section, and a withdrawn position where said coupling lock of the additional foot enables vertical separation of said additional foot from said fixed section, said additional foot further comprising a flexible sliding pad which rests on said fixed section and which is adapted: to hold the coupling claw of said additional foot in contact under the longitudinal edge of the fixed section while the seat is not occupied by a passenger and to be compressed when the seat is occupied by a passenger so that said coupling claw of the additional foot does not interfere then with the longitudinal edge of the fixed section.

31. A seat assembly according to claim 30, wherein the coupling claw of the additional foot is covered at least partially by a lining of flexible material which is adapted to come into contact under the fixed section while the seat is not occupied by a passenger.

* * * * *